United States Patent [19]

Andersson

[11] Patent Number: 5,308,694
[45] Date of Patent: May 3, 1994

[54] BARRIER LAYER FOR FLOOR AND WALL COVERINGS

[75] Inventor: Tommy Andersson, Ronneby, Sweden

[73] Assignee: Tarkett AB, Ronneby, Sweden

[21] Appl. No.: 923,319

[22] Filed: Jul. 31, 1992

[51] Int. Cl.$^5$ .............................................. B32B 5/16
[52] U.S. Cl. .................................. 428/331; 428/327; 428/518; 428/908.8
[58] Field of Search ............ 428/518, 327, 331, 908.8

[56] References Cited

U.S. PATENT DOCUMENTS

| | | | |
|---|---|---|---|
| 1,365,715 | 1/1921 | Morrison. | |
| 1,466,241 | 8/1923 | Naemura. | |
| 1,949,914 | 3/1934 | Larson | 87/17 |
| 2,485,287 | 10/1949 | Henson et al. | 260/41 |
| 4,510,201 | 4/1985 | Takeuchi et al. | 428/285 |

*Primary Examiner*—Edith Buffalow
*Attorney, Agent, or Firm*—Brooks, Haidt, Haffner & Delahunty

[57] ABSTRACT

Floor and wall covering materials are provided with a barrier layer to inhibit the migration or dispersion of organic stainants from the surface of the underlying floor or wall into the decorative portions of the covering materials. The barrier layer comprises a plastisol and sodium silicate which is coated onto or incorporated into the floor or wall covering in the wet state as a mixture of plastisol and water glass, followed by heating to drive off water and gel or fuse the plastisol. The barrier layer is particularly compatible with sheet vinyl floor and wall covering materials. It can be coated onto the underside of the covering material or incorporated as a layer between the underside and the decorative portion of such material.

11 Claims, No Drawings

BARRIER LAYER FOR FLOOR AND WALL COVERINGS

BACKGROUND OF THE INVENTION

1. Field of the Invention

The present invention has to do with a barrier layer which inhibits the migration of underlying organic stain into the decorative portion of floor covering and wall covering materials. More particularly, the invention relates to a barrier layer comprised of a plastisol and sodium silicate which is incorporated into a floor or wall covering to inhibit the migration of organic materials from the surface underlying the floor or wall covering into the decorative portion thereof.

2. Description of Related Art

Floor covering and wall covering materials frequently are applied over surfaces which have been coated or marked with organic substances such as sealants, wood stains, ink from marking pens, asphalt, oil based paints and the like. These organic substances can migrate or diffuse into the floor or wall covering and cause staining of the decorative portion thereof, which destroys the decorative appearance.

Organic substances can cause staining of a variety of floor and wall coverings such as carpeting, sheet vinyl flooring, and cloth or vinyl wall coverings. Sheet vinyl flooring and wall covering products are particularly vulnerable because they contain plasticizers which are compatible with organic substances. The stains thereby diffuse into the floor or wall covering by means of the plasticizer as a vehicle. The higher the plasticizer content, normally, the faster the stain diffuses. According to the preferred embodiment of the present invention, a barrier which inhibits such migration is incorporated in the sheet material as a layer which may be adhered as the back or underside of the sheet material, or incorporated between the back and the decorative portion of the sheet material.

Sodium silicates, called water glass when they are dissolved in water, have been employed in coatings and adhesives. U.S. Pat. No. 1,365,715, for example, discloses the use of sodium silicate as a replacement for a part of the glue used in sizing compositions. The sizing composition described in the patent employs sodium silicate, an organic adhesive (e.g., glue) and a filler such as clay, casein, or starch in an aqueous solution. The composition is described as particularly adapted for use in sizing wood, paper and similar pulp boards and other articles consisting largely of cellulose or other fibrous or absorbent materials because the sodium silicate causes swelling of the fibers and allows them to be penetrated by the filler, thereby preventing the migration of moisture and organic liquids (e.g., paint) into the cellulosic material.

The use of sodium silicate in aqueous solutions to make water resistant compositions is also disclosed in U.S. Pat. No. 1,949,914. Modified aqueous sodium silicate solutions are described in the patent as containing complex amine compounds which facilitate the production of water resistant films.

In U.S. Pat. No. 1,466,241, a floor covering material is disclosed which consists of a mat covered with a mixture of powdered soya bean or the like albuminous substances, ammonia water, fibers as binding material, and pigment. The patent includes an example wherein sodium silicate is employed to solidify the albuminous substances which have been acted upon and dissolved by the ammonia. A coating is thereby obtained which is described as water proof and almost fireproof.

A method is disclosed in U.S. Pat. No. 2,485,287 for co-precipitating plastic materials and compounding ingredients in aqueous media. The method illustrates the difficulty encountered when one attempts to combine such materials. It requires the association of a coagulable aqueous dispersion of an organic plastic material, such as a natural or synthetic rubber or resin latex, with an aqueous solution of a water soluble reagent which is one component from which the compounding ingredient may be produced by chemical reaction, and with an aqueous solution of a second water soluble reagent reactive with the first reagent to form the compounding ingredient in a manner such that the various reactants remain in substantially distinct layers or moving streams while permitting diffusional intermingling of the separate reactants. A reaction of the water soluble chemical reagents is thereby effected to form the insoluble compounding ingredient in particulate form with simultaneous coagulation of the aqueous dispersion. An aqueous slurry is formed comprising the insoluble compounding ingredient enclosed or enmeshed in the plastic material. The plastic material is said to surround and enclose extremely small particles of insoluble compounding ingredient. An embodiment exemplified in the patent is a method of making a latex having water glass incorporated therein.

U.S. Pat. No. 4,510,201 describes polyvinyl chloride resin compositions combined with a cellular filler which reduces the density of the resin. A cellular filler is incorporated by dry blending polyvinyl chloride resin, a plasticizer, a stabilizer and the cellular filler, in a manner which does not destroy the cellular filler, to make a free flowing powder. Several inorganic cellular fillers are described as suitable, including sodium silicate. The patent also describes polyvinyl chloride sheet products containing cellular fillers which can be used in floor coverings to make them light, superior in flexibility and bending strength, dimensional stability, water resistance and improved adhesiveness.

None of the foregoing references resolve the need for a barrier layer which can be incorporated into a floor or wall covering material to inhibit the migration of organic stainants.

SUMMARY OF THE INVENTION

Floor and wall covering materials having resistance to the migration of organic stainants are prepared by incorporating therein a barrier layer comprised of plastisol and sodium silicate. The barrier layer inhibits the migration or diffusion of organic stainants from the surface of the underlying floor or wall into the decorative portion of the covering material.

A barrier composition is prepared by admixing sodium silicate dissolved in water (water glass) with a plastisol composition. The plastisol composition includes a dispersing-suspension agent to maintain the water glass in uniform admixture with the plastisol composition.

The barrier composition can be coated onto the back of the back surface (i.e., the underside) of a floor or wall covering material or it can be coated on as one of the layers during manufacture of the covering material, provided that it is disposed between the back surface and the decorative portion thereof. After the barrier composition has been applied, it is heated to remove water and to gel or to fuse the plastisol.

All percentages expressed in this specification and claims are by weight unless denoted otherwise.

DESCRIPTION OF THE PREFERRED EMBODIMENTS

The barrier layer of the invention can be employed with any floor or wall covering material including wall paper, wall cloths, vinyl wall covering, carpeting and vinyl floor covering, as long as it can be sufficiently adhered thereto or incorporated therein. The barrier layer is particularly suited to sheet vinyl floor and wall covering materials because the plastisol component of the barrier composition is compatible with vinyls and is easily adhered to vinyl materials and to the substrate materials which typically are employed in the manufacture of sheet vinyl materials. Moreover, in multi-layer sheet vinyl products, particularly floor covering materials, there are numerous options for locating the barrier layer either as a layer or an element of a layer within the product or as a coating on the back of the product.

While the principles of the invention are applicable to various floor and wall covering materials, the preferred embodiment will be described herein with reference to sheet vinyl floor coverings. The principles disclosed can be applied by those skilled in the art to other floor and wall covering materials.

Sheet vinyl floor covering materials generally are comprised of a substrate overlayed by a decorative layer or layers and one or more wear layers. The substrate can be overlayed with latex and/or plastisol layers before application of the decorative portion. The substrate also can be undercoated with latex and/or plastisol layers or the substrate can be stripped off after it serves its purpose as a carrier for other components of the sheet vinyl flooring product.

Decorative elements of floor covering can include embossing, by chemical or mechanical means, pigments, dyes, printing inks and particulate matter, such as chips, flakes, pearls and the like. These decorative elements can be used alone, or two or more can be combined in various ways, to achieve desired decorative effects. It is also possible to include decorative elements in more than one layer of the floor covering. Certain portions of decorative elements, or the layers embodying them, might not be visible from above the installed floor covering. For example, a chemically blown layer which causes the floor covering to have an embossed effect can be located below layers which are opaque, such as an opaque printed layer. Moreover, portions of pigmented layers or printing inks which are below the upper surface might not be visible. Accordingly, the term "decorative portion" as used in this specification means the visible portion of the decorative elements, and the objective of the invention is to avoid the migration of stains into such visible portions.

Numerous constructions for sheet vinyl floor covering materials are known in the art in addition to those enumerated above. They share as a common characteristic, however, a layered construction to which the principles of this invention are easily applied.

In the manufacture of sheet vinyl floor covering materials, a substrate is employed as a carrier for the vinyl and decorative elements, as note above. The substrate is a relatively flat, fibrous or non-fibrous, backing sheet material, such as a fibrous, felted or matted, relatively flat sheet of overlapping, intersecting fibers. The substrate can comprise felts or papers which are woven or non-woven. It can comprise knitted or otherwise fabricated textile material or fabrics made from cellulose, glass, natural or synthetic organic fibers, or natural or synthetic inorganic fibers, or supported or non-supported webs or sheets made therefrom, or filled or unfilled thermoplastic or thermoset polymeric materials. These and other substrate materials are well known in the art and need not be further detailed here.

Various layers which can be applied directly to the substrate include latexes, plastisols and foamable plastics which can be pigmented or be free of pigmentation. Plastisol inks with or without foaming agents also can be applied.

The barrier layer of the invention can be any layer or a part of any layer of the floor or wall covering material which is located between the surface underlying the floor or wall covering and the decorative portion of the floor or wall covering. As an example, the barrier composition can be applied to the underside of the substrate and cured as the final processing step in the manufacture of the floor covering material. In another embodiment, it can be applied as the first layer over the substrate and can optionally include blowing agents and decorative elements such as pigments, inks or particulate materials.

The plastisol employed in the barrier composition is a relatively high molecular weight polyvinyl chloride resin dispersed in one or more plasticizers. The components of the plastisol composition must be compatible with the sodium silicate and, in particular, must not include compounds which would react with the sodium silicate to cause precipitation or agglomeration.

For purposes of this specification, plastisol compositions are also intended to include organosols, which are similarly dispersed polyvinyl chloride resin materials that, in addition, contain one or more volatile liquids which are driven off upon heating.

When the barrier composition of the invention is heated to gel or fuse it, water is driven off and a tough plasticized solid is formed.

The composition of the barrier layer must be compatible with the adjacent underlying layer and any layer which might be coated over it, and it must form a strong adhesive bond with any such layer or layers.

The barrier composition is substantially uniformly applied in its wet state to the underlying surface by conventional means such as a knife-over roll coater, direct roll coater, rotary screen, drawdown bar, reverse roll coater or wire wound bar. The particular means for applying the composition does not relate to the essence of the invention, and any suitable coating means can be employed.

The thickness of the barrier layer is substantially uniform and is in the range from about 1 to about 500 mils., preferably from about 10 to about 16 mils. The layer can be thicker or thinner as may be required by the particular product application.

After the barrier composition is applied to the substrate or another layer of the floor covering material, the combination is heated for a period of time and at a temperature sufficient to evaporate water and gel or fuse the plastic composition. As will be apparent to those skilled in the art, if the combination contains a blowing or foaming agent, heating at this stage should not be sufficient to activate such blowing or foaming agent unless activation is desired.

Heating of the combination containing the barrier composition can be carried out in an oven or on a heated chrome drum. Heating conditions will vary depending on the plasticizers and resins used as will be apparent to those skilled in the art. Heating in an oven is preferred, and if an oven is used a residence time in the oven of from about 1 minute to about 4 minutes at an oven temperature from about 180° C. to about 145° C. would give good results. The higher temperatures are used with shorter residence times and lower temperatures with longer times. Following heating, the combination optionally can be cooled with one or more cooling drums or with fans or blowers.

The barrier composition of the invention comprises a mixture of plastisol, sodium silicate and water. The sodium silicate and water combination (water glass) generally comprises from about 15 to about 54% sodium silicate. The water glass is employed in an amount from about 5 to about 25 parts by weight of the plastisol composition. Thus, the amount of sodium silicate employed is in an amount from about 0.75 to about 13.5 percent by weight of the plastisol composition. Generally, the barrier properties of the barrier layer are improved as the concentration of sodium silicate is increased. When the barrier composition is gelled or fused, the sodium silicate provides an inorganic matrix within the barrier layer which inhibits the migration of plasticizer and stain into that layer.

The components of the plastisol composition must be carefully selected to avoid materials which react with the sodium silicate and cause precipitation or agglomeration. The compatibility of components can easily be determined on a laboratory scale by those skilled in the art. Examples of components which have been found to be incompatible are fillers such as calcium carbonate and titanium which are highly reactive with sodium.

A dispersing-suspension agent is employed as a component of the plastisol composition so that a uniform mixture of the barrier composition can be maintained. Suitable dispersing-suspension agents for use in the plastisol component of the barrier composition include BYK ® 4010, a mixture of aliphatic hydrocarbons and wetting agents, available from BYK-Chemie USA, 524 South Cherry Street, Wallingford, Conn. 06492 USA. BYK ® 4010 is comprised of 92% alkene and 5% unsaturated fatty acid.

Suitable stabilizers for use in the plastisol component of the barrier composition include organotin compounds such as STANCLERE® T-4851, available from AKZO Chemicals Inc., 5 Livingston Avenue, Dobbs Ferry, N.Y. 10522 USA. STANCLERE® T-4851 comprises 65-75% dioctyltin bis(isooctylthioglycolate) (15% as Sn); monooctyltin tris(isoocylthioglycolate) (14% as Sn); and less than 10% organotin carboxylate (20% as Sn).

The water glass is added as the last ingredient after the plastisol is formulated.

The composition stability is sensitive and it is recommended that compositions be tested on a laboratory scale before they are employed commercially, as will be apparent to those skilled in the art.

EXAMPLES

EXAMPLE 1

A substrate comprised of a glass mat saturated with pigmented and filled plastisol was printed with a design. A layer of clear adhesive filled with decorative pearls was applied over the design and gelled with a heated chrome drum. A clear vinyl wear layer was applied and the composite was fused in an oven. Then a clear urethane layer was applied to the vinyl wear layer and cured.

A barrier composition was prepared having the following components:

| Component | Parts by Weight |
|---|---|
| Dispersion Resin Oxy 605, 62K value | 64 |
| Suspension Resin Pliovic M 50, 55K value | 36 |
| Plasticizer Monsanto S-377 | 11 |
| Plasticizer Diisononylththalate | 11 |
| Plasticizer TXIB | 10 |
| STANCLERE ® T-4851 | 3 |
| BYK ® 4010 | 5 |
| Sodium Silicate Solution (40% solids) | 15 |

The barrier composition was applied to the back surface of the saturated glass mat at a thickness of approximately 12-14 mils. by means of a drawdown bar. The composite was passed face down through a hot air box oven at a temperature of 320° F. for a residence time of approximately 3.5 minutes. The water from the sodium silicate solution evaporated during heating and the barrier composition formed a solid layer having a sodium silicate matrix resistant to migration.

EXAMPLE 2

A sheet vinyl floor covering material was selected having the following construction: 1) a glass mat saturated with pigmented and filled vinyl as a substrate; 2) a chemically blown embossed foam overlaying the substrate; 3) a printed pattern applied over the surface of the foam; and 4) a clear polyvinyl chloride wear layer overlaying the printed layer.

To the back of the floor covering material a barrier composition employing a phosphate plasticizer to impart flame and smoke resistant properties was applied by a drawdown bar to a thickness of 12-14 mils. The product was fused face down in a hot air oven at 320° F. for a residence time of 3 minutes. The barrier composition had the following components:

| Component | Parts by Weight |
|---|---|
| Dispersion Resin Oxy 605, 62K value | 64 |
| Suspension Resin Pliovic M 50, 55K value | 36 |
| (Phosphate) Plasticizer Monsanto S-2148 | 11 |
| Plasticizer Monsanto S-377 | 11 |
| Plasticizer Diisononylththalate | 11 |
| Plasticizer TXIB | 10 |
| STANCLERE ® T-4851 | 3 |
| BYK ® 4010 | 5 |
| Sodium Silicate Solution (40% solids) | 15 |

Having set forth the general nature and some examples of the invention, the scope is now more particularly set forth in the appended claims.

I claim:

1. A barrier layer which inhibits the migration of underlying organic stain into the decorative portion of floor covering and wall covering materials, said barrier layer comprising an admixture of plastisol and sodium silicate, wherein the sodium silicate is in the form of an inorganic matrix with the plastisol, and wherein a component of the plastisol is a dispersing-suspension agent.

2. The barrier layer of claim 1 wherein the sodium silicate is present in an amount from about 0.75 to about 13.5 percent by weight.

3. A barrier composition comprising an admixture of sodium silicate dissolved in water and a plastisol having as a component a dispersing-suspension agent, wherein the sodium silicate dissolved in water is present in an amount from about 5 to about 25 percent by weight.

4. A sheet vinyl floor or wall covering material having a barrier layer which inhibits the migration of underlying organic stain into the decorative portions of the floor or wall covering material, said barrier layer comprising a layer of plastisol and sodium silicate.

5. The sheet vinyl floor or wall covering material of claim 4 wherein the barrier layer is adhered to the sheet vinyl floor or wall covering as a coating on the back surface thereof.

6. The sheet vinyl floor or wall covering material of claim 4 wherein the barrier layer is a layer or an element of a layer disposed between the back surface and the decorative portion thereof.

7. The barrier composition of claim 4, wherein the sodium silicate dissolved in water, upon heating, forms an inorganic matrix with the plastisol.

8. The sheet vinyl floor or wall covering material of claim 4 wherein the barrier layer is comprised of an admixture of plastisol and sodium silicate, wherein the sodium silicate is in the form of an inorganic matrix with the plastisol, and wherein a component of the plastisol is a dispersing-suspension agent.

9. A barrier layer which inhibits the migration of underlying organic stain into the decorative portion of floor covering and wall covering materials, said barrier layer consisting essentially of an admixture of a plastisol and sodium silicate, said plastisol having a dispersing-suspension agent component.

10. The barrier layer of claim 9, wherein the sodium silicate is in the form of an inorganic matrix with the plastisol.

11. The barrier layer of claim 10, wherein the sodium silicate is present in an amount from about 0.75 to about 13.5 percent by weight.

* * * * *